US012647317B2

(12) United States Patent
Dilger, II

(10) Patent No.: US 12,647,317 B2
(45) Date of Patent: Jun. 2, 2026

(54) CONFIGURING ELECTRONIC EQUIPMENT FROM A USER DEVICE USING A SELF-GENERATED NETWORK ADDRESS

(71) Applicant: Dell Products L.P., Round Rock, TX (US)

(72) Inventor: George H. Dilger, II, New Ipswich, NH (US)

(73) Assignee: Dell Products L.P., Round Rock, TX (US)

( * ) Notice: Subject to any disclaimer, the term of this patent is extended or adjusted under 35 U.S.C. 154(b) by 110 days.

(21) Appl. No.: 18/662,179

(22) Filed: May 13, 2024

(65) Prior Publication Data

US 2025/0350529 A1     Nov. 13, 2025

(51) Int. Cl.
*G06F 15/16*        (2006.01)
*H04L 41/0806*     (2022.01)
*H04L 41/0894*     (2022.01)
*H04L 67/141*       (2022.01)

(52) U.S. Cl.
CPC ...... *H04L 41/0806* (2013.01); *H04L 41/0894* (2022.05); *H04L 67/141* (2013.01)

(58) Field of Classification Search
CPC ...................... H04L 41/0806; H04L 41/0894; H04L 67/141
USPC ........................................................ 709/220
See application file for complete search history.

(56) References Cited

U.S. PATENT DOCUMENTS

| | | | | |
|---|---|---|---|---|
| 7,688,792 | B2 * | 3/2010 | Babbar ............... | H04L 63/0227 |
| | | | | 455/414.1 |
| 7,924,832 | B2 * | 4/2011 | Li ........................... | H04W 8/26 |
| | | | | 709/245 |
| 8,122,488 | B2 * | 2/2012 | Hoch ...................... | H04L 63/10 |
| | | | | 705/14.1 |
| 8,526,467 | B2 * | 9/2013 | Li .......................... | H04L 69/167 |
| | | | | 370/466 |
| 8,594,099 | B2 * | 11/2013 | Park ................... | H04Q 11/0478 |
| | | | | 370/395.2 |
| 9,184,930 | B2 * | 11/2015 | Singh ................... | H04L 12/2801 |
| 9,407,701 | B2 * | 8/2016 | Graessley ........... | H04L 61/4511 |
| 9,838,390 | B2 * | 12/2017 | Zakaria ................... | H04W 4/70 |
| 9,985,872 | B2 | 5/2018 | Jaffer et al. | |
| 10,003,855 | B2 * | 6/2018 | Hardt ................... | G08B 13/196 |
| 10,034,118 | B2 * | 7/2018 | Goluboff .............. | H04L 63/083 |
| 10,257,061 | B2 | 4/2019 | Menon et al. | |
| 10,440,122 | B2 * | 10/2019 | Brickell ................. | H04L 67/10 |
| 10,728,207 | B2 * | 7/2020 | Mudric .............. | H04L 65/1104 |

(Continued)

*Primary Examiner* — Alicia Baturay
(74) *Attorney, Agent, or Firm* — BainwoodHuang

(57) ABSTRACT

A technique configures electronic equipment for routine network access. The technique involves establishing a network connection between the electronic equipment and a user device using a predefined network address for the electronic equipment and a self-generated network address for the user device. The technique further involves creating a configuration session on the electronic equipment, the configuration session being constructed and arranged to receive configuration input from the user device through the network connection established between the electronic equipment and the user device. The technique further involves, in response to a set of configuration commands from the user device received as configuration input by the configuration session, configuring the electronic equipment for routine network access via a set of new network addresses.

20 Claims, 4 Drawing Sheets

(56)                 References Cited

U.S. PATENT DOCUMENTS

| | | | |
|---|---|---|---|
| 10,841,206 B2 | 11/2020 | Menon et al. | |
| 10,887,398 B2 * | 1/2021 | Brickell | .................. H04L 67/02 |
| 11,310,080 B2 * | 4/2022 | Duan | ................. G06F 9/45558 |
| 11,343,321 B2 * | 5/2022 | Brickell | ................ H04L 67/125 |
| 2018/0159958 A1 * | 6/2018 | Olive | ...................... H04L 67/34 |
| 2019/0037459 A1 | 1/2019 | Pelletier et al. | |
| 2020/0196135 A1 * | 6/2020 | Mudric | ................ H04L 69/167 |
| 2021/0028987 A1 | 1/2021 | Krivenok | |
| 2024/0303358 A1 | 9/2024 | Kulkarni et al. | |

* cited by examiner

100

102

Host Computer 102(1)

Host Computer 102(2)

. . .

120

108

130

User Device 106

122

Electronic Equipment 104
(e.g., a Storage Array which is Accessible
via IPv4 and IPv6 Communications, etc.)

240

Electronic Circuitry 200

Set of Interfaces 202

220

Memory 204

Operating System 222

Specialized Code 224
Constructed and Arranged to
Acquire Configuration Input for
Routine Network Access from a User Device
using a Self-Generated Network Address Other Code and/or Data 226

Processing Circuity 206

Other Componentry 208

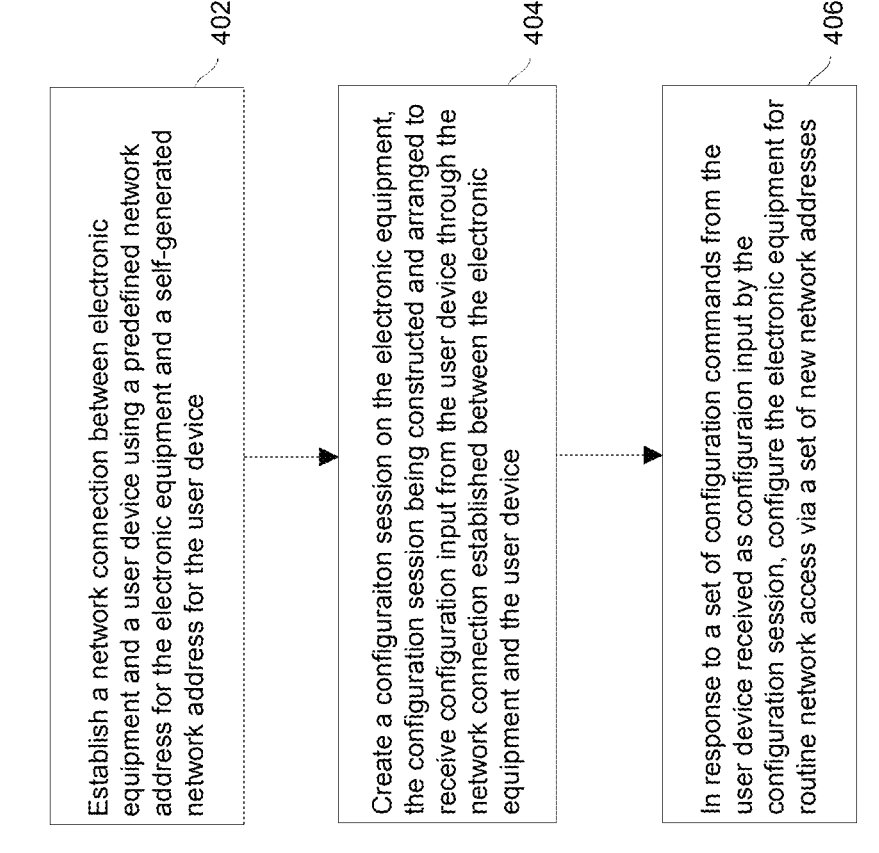

400

Establish a network connection between electronic equipment and a user device using a predefined network address for the electronic equipment and a self-generated network address for the user device

402

Create a configuraiton session on the electronic equipment, the configuration session being constructed and arranged to receive configuration input from the user device through the network connection established between the electronic equipment and the user device

404

In response to a set of configuration commands from the user device received as configuraion input by the configuration session, configure the electronic equipment for routine network access via a set of new network addresses

CONFIGURING ELECTRONIC EQUIPMENT FROM A USER DEVICE USING A SELF-GENERATED NETWORK ADDRESS

BACKGROUND

A typical data storage system includes storage processors and storage drives. During operation, the storage processors store data within the storage drives and load data from the storage drives on behalf of one or more host computers.

Prior to beginning operation, a human operator programs the data storage system with particular network addresses to enable host computers to then communicate with the data storage system. To this end, while both the data storage system and a workstation are connected to a wired computer network, a human operator changes the original (or current) Internet Protocol version 4 (IPv4) address of the workstation to a specific IPv4 address that the data storage system is preconfigured to communicate with. Next, the human operator logs into the data storage system from the workstation through the wired computer network (with the data storage system recognizing the workstation via the preconfigured IPv4 address) and programs the particular network addresses into the data storage system from the workstation. Once the data storage system has been programmed with the particular network addresses, host computers are able to communicate with the data storage system via the particular network addresses.

SUMMARY

Unfortunately, there are deficiencies to the above-described conventional approach to programming particular network addresses into a data storage system which involves changing the original IPv4 address of a workstation to a preconfigured IPv4 address. Along these lines, human operators who are less knowledgeable about networks may have difficulty changing the original IPv4 address to the preconfigured IPv4 address. For example, the human operators may mistake periods (i.e., ".") in the IPv4 address for other symbols such as commas, colons, etc., may mistake numbers for letters, may use an incorrect number of digits and/or subnets, and so on. Moreover, such human operators may inadvertently disable further use of the workstation if the human operators forget to restore the workstation back to using the original IPv4 address once programming of the data storage system is complete.

Additionally, less knowledgeable human operators may not realize that changing the original IPv4 address to the specific IPv4 address may prevent other workstation applications, services, processes, etc. from running properly. Along these lines, the workstation may have one or more open files, backup services, other established network connections, etc. that no longer operate correctly while the workstation is not using the original IPv4 address, or even after the workstation has been changed back to using the original IPv4 address. Moreover, the less knowledgeable user may not know how to restore files that were not properly closed, restart backup services that failed or stopped running, re-establish network connections that were broken, and so on.

Furthermore, due to the number of steps and/or complexity involved in the above-described conventional approach, human operators may delay or even postpone programming the particular network addresses into the data storage system. For example, the human operators may need to wait extended amounts of time until other applications, scheduled services, etc. complete certain tasks and/or shutdown properly. Additionally, the human operators may decide to wait or even cancel programming altogether until they can involve someone with stronger network expertise due to the intricacies in modifying the IPv4 address of the workstation.

In contrast to the above-described conventional approach to changing the IPv4 address of the workstation when programming particular network addresses into a data storage system, improved techniques are directed to configuring electronic equipment from a user device using a self-generated network address. Along these lines, a user may program network addresses into the electronic equipment without changing an original IPv4 address of the user device (e.g., a laptop, a desktop computer, or other smart device). Instead, the user is able to simply establish a network connection between the electronic equipment and the user device using a network address that is self-generated (or internally created) by the user device. Such a self-generated network address may be an Internet Protocol version 6 (IPv6) address that the user device automatically (or dynamically) creates when the user enables IPv6 (or expressly enters an auto link-local command) on the user device. In such a situation, both the electronic equipment and the user device may then easily establish a rich and reliable network connection using local IPv6 addresses (e.g., to establish a web session which enables the user to configure the electronic equipment).

It should be appreciated that, in the above-described conventional approach, it is impractical for the data storage system to be preconfigured to operate on a particular subnet due to the uniqueness built into the IPv4 format. That is, since the IPv4 format is x.x.x.x where each x is an octet and must be a decimal value between 0 and 255 and where the first three octets identify the usable IPv4 network segment, an approach of preconfiguring data storage systems to operate on a particular network segment would not work. Accordingly, a human operator uses the conventional approach which involves modifying the current IPv4 address of the workstation to connect with the data storage system.

However, since local IPv6 addresses simply begin with "FE80", the electronic equipment is easily provisioned to practice (or employ) the improved techniques. That is, in accordance with certain embodiments employing the improved techniques, the electronic equipment is constructed and arranged to establish network connections on an IPv6 local network and the user device automatically generates a network address on the same IPv6 local network (e.g., both may simply use network addresses beginning with "FE80").

One embodiment is directed to a method of configuring electronic equipment for routine network access. The method includes establishing a network connection between the electronic equipment and a user device using a predefined network address for the electronic equipment and a self-generated network address for the user device. The method further includes creating a configuration session on the electronic equipment, the configuration session being constructed and arranged to receive configuration input from the user device through the network connection established between the electronic equipment and the user device. The method further includes, in response to a set of configuration commands from the user device received as configuration input by the configuration session, configuring the electronic equipment for routine network access via a set of new network addresses.

Another embodiment is directed to electronic equipment which includes memory, and control circuitry coupled to the memory. The memory stores instructions which, when carried out by the control circuitry, cause the control circuitry to perform a method of:

(A) establishing a network connection between the electronic equipment and a user device using a predefined network address for the electronic equipment and a self-generated network address for the user device;

(B) creating a configuration session on the electronic equipment, the configuration session being constructed and arranged to receive configuration input from the user device through the network connection established between the electronic equipment and the user device; and (C) in response to a set of configuration commands from the user device received as configuration input by the configuration session, configuring the electronic equipment for routine network access via a set of new network addresses.

Yet another embodiment is directed to a computer program product having a non-transitory computer readable medium which stores a set of instructions to configure computerized circuitry (e.g., control circuitry of electronic equipment) for routine network access. The set of instructions, when carried out by computerized circuitry, cause the computerized circuitry to perform a method of:

(A) establishing a network connection between the computerized circuitry and a user device using a predefined network address for the computerized circuitry and a self-generated network address for the user device;

(B) creating a configuration session on the computerized circuitry, the configuration session being constructed and arranged to receive configuration input from the user device through the network connection established between the computerized circuitry and the user device; and (C) in response to a set of configuration commands from the user device received as configuration input by the configuration session, configuring the computerized circuitry for routine network access via a set of new network addresses.

In some arrangements, the electronic equipment is a storage array constructed and arranged to manage host data on behalf of a set of host computers. Additionally, the method further includes performing data storage operations in response to input/output (I/O) requests sent to the storage array from the set of host computers using the set of new network addresses.

In some arrangements, establishing the network connection between the electronic equipment and the user device includes, while the user device remains accessible to Internet Protocol version 4 (IPv4) communications via an IPv4 address, forming an Internet Protocol version 6 (IPv6)-based connection in which the predefined network address and the self-generated network address are IPv6 addresses.

In some arrangements, first I/O requests identify the storage array as a destination via the IPv4 address, and second I/O requests identify the storage array as a destination via the IPv6 address. Additionally, wherein performing the data storage operations includes writing data into a set of storage devices and reading data from the set of storage devices in response to the first I/O requests and the second I/O requests.

In some arrangements, prior to establishing the network connection, the user device generates a unique local network address as the self-generated network address based on a media access control (MAC) address assigned to the user device. Additionally, establishing the network connection between the electronic equipment and the user device includes:

(i) receiving a connection request from the user device, the connection request including the unique local network address as the self-generated network address for the user device, and (ii) in response to the connection request from the user device, exchanging messages between the electronic equipment and the user device to form the network connection.

In some arrangements, creating the configuration session on the electronic equipment includes:

(i) receiving a page request from a browser running on the user device through the network connection, and (ii) providing a webpage to the browser running on the user device through the network connection to commence a web session as the configuration session.

In some arrangements, the set of new network addresses includes an IPv4 address. Additionally, configuring the electronic equipment for routine network access includes configuring the electronic equipment to receive and process network messages which use the IPv4 address as a destination address.

In some arrangements, the set of new network addresses includes an IPv6 address. Additionally, configuring the electronic equipment for routine network access includes configuring the electronic equipment to receive and process network messages which use the IPv6 address as a destination address.

In some arrangements, the set of new network addresses includes an IPv4 address and an IPv6 address. Additionally, configuring the electronic equipment for routine network access includes configuring the electronic equipment to receive and process network messages which use the IPv4 address and the IPv6 address as destination addresses.

It should be understood that, in the cloud context, at least some electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in configuring electronic equipment from a user device using a self-generated network address.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 4 is a flowchart of a procedure which is performed in accordance with certain embodiments.

DETAILED DESCRIPTION

An improved technique is directed to configuring electronic equipment from a user device using a self-generated network address. Along these lines, a user may program network addresses into the electronic equipment without changing an original IPv4 address of the user device (e.g., a laptop, a desktop computer, or other smart device). Rather, the user is able to simply establish a network connection between the electronic equipment and the user device using a network address that is self-generated (e.g., automatically created internally) by the user device. Such a self-generated network address may be an Internet Protocol version 6 (IPv6) address that the user device creates in response to enabling IPv6 on the user device or an auto link-local command. As a result, both the electronic equipment and the user device may then easily establish a network connection (e.g., an IPv6-based local link) through which the user then programs network addresses into the electronic equipment.

Figure 1:
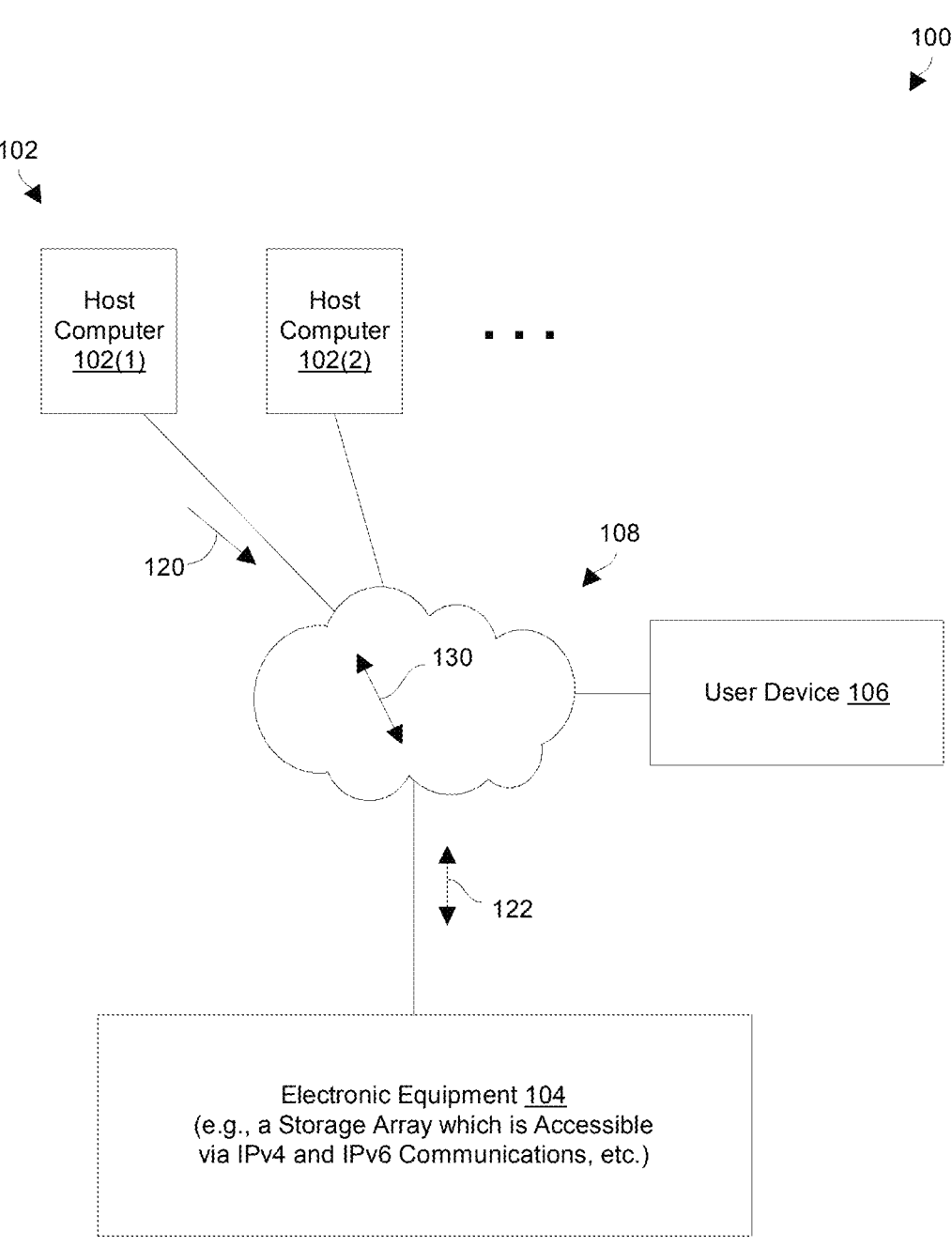
FIG. 1 is a block diagram of an electronic setting having electronic equipment in accordance with certain embodiments.

FIG. 1 shows an electronic setting 100 having electronic equipment which is configured by a user device using a self-generated network address in accordance with certain embodiments. The electronic setting 100 includes host computers 102(1), 102(2), . . . (collectively, host computers 102), electronic equipment 104, a user device 106, and a communications medium 108.

Each host computer 102 is constructed and arranged to perform useful work. For example, in the context of a data storage environment in which the electronic equipment 104 is a storage array, one or more of the host computers 102 may operate as a file server, a web server, an email server, an enterprise server, a database server, a transaction server, a client device, combinations thereof, etc. which provides host input/output (I/O) requests 120 to the storage array. In this context, the host computers 102 may provide a variety of different I/O requests 120 (e.g., block and/or file based write commands, block and/or file based read commands, combinations thereof, etc.) that direct the storage array to store host data 122 within and retrieve host data 122 from storage (e.g., primary storage or main memory, secondary storage, tiered storage, combinations thereof, etc.).

The electronic equipment 104 is constructed and arranged to be routinely accessed by the host computers 102. Along these lines, the electronic equipment 104 may be a storage array having storage processing circuitry and storage devices, e.g., solid state devices (SSDs), hard disk drives (HDDs), combinations thereof, etc. Other types of electronic equipment 104 are suitable for use as well such as general purpose computing equipment, database equipment, computational equipment, network equipment, specialize equipment, combinations thereof, etc.

The user device 106 is constructed and arranged to configure the electronic equipment for access by the host computers 102. Along these lines, the user device 106 is provisioned to establish network connections with the electronic equipment 104 through the communications medium 108. Suitable types of apparatus for the user device 106 include a desktop computer, a laptop, and other smart devices. Such apparatus enable a user to initially connect with the electronic equipment 104 prior to the electronic equipment 104 being configured with network addresses suitable for routine network access.

The communications medium 108 is constructed and arranged to connect the various components of the electronic setting 100 together to enable these components to exchange electronic signals 130 (e.g., see the double arrow 130) and thus communicate with each other. The communications medium 108 is illustrated as a cloud to indicate that the communications medium 108 is capable of having a variety of different topologies including backbone, hub-and-spoke, loop, irregular, combinations thereof, and so on. Along these lines, the communications medium 108 may include copper-based data communications devices and cabling, fiber optic devices and cabling, wireless devices, combinations thereof, etc. Furthermore, the communications medium 108 is capable of supporting LAN-based communications, SAN-based communications, cellular communications, combinations thereof, etc.

During operation, the electronic equipment 104 establishes a network connection with the user device 106 using a predefined network address for the electronic equipment 104 and a self-generated network address for the user device 106. The self-generated network address may be dynamically created on the user device 106 in a variety of ways such as by enabling IPv6 or via an auto link-local command. Once the user device 106 has generated the network address, the user device 106 is able to a send message to the electronic equipment 104 to create a configuration session (e.g., a web session in response to a web page request from the user device 106). Within the web session, the electronic equipment 104 is able to receive configuration input specifying a set of new network addresses for the electronic equipment 104. Accordingly, the electronic equipment 104 is then able to be routinely accessed by the host computers 102 via the set of new network addresses.

It should appreciated that such operation did not involve modifying a current IPv4 network address used by the user device 106. Accordingly, the user device 106 is able to continue operating without any disruption, and there is no need to subsequently change the user device 106 back to using the original IPv4 network address. Further details will now be provided with reference to FIG. 2.

Figure 2:
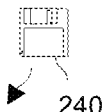
FIG. 2 is a block diagram of electronic circuitry which is suitable for at least a portion of the electronic equipment in accordance with certain embodiments.
Figure 2:
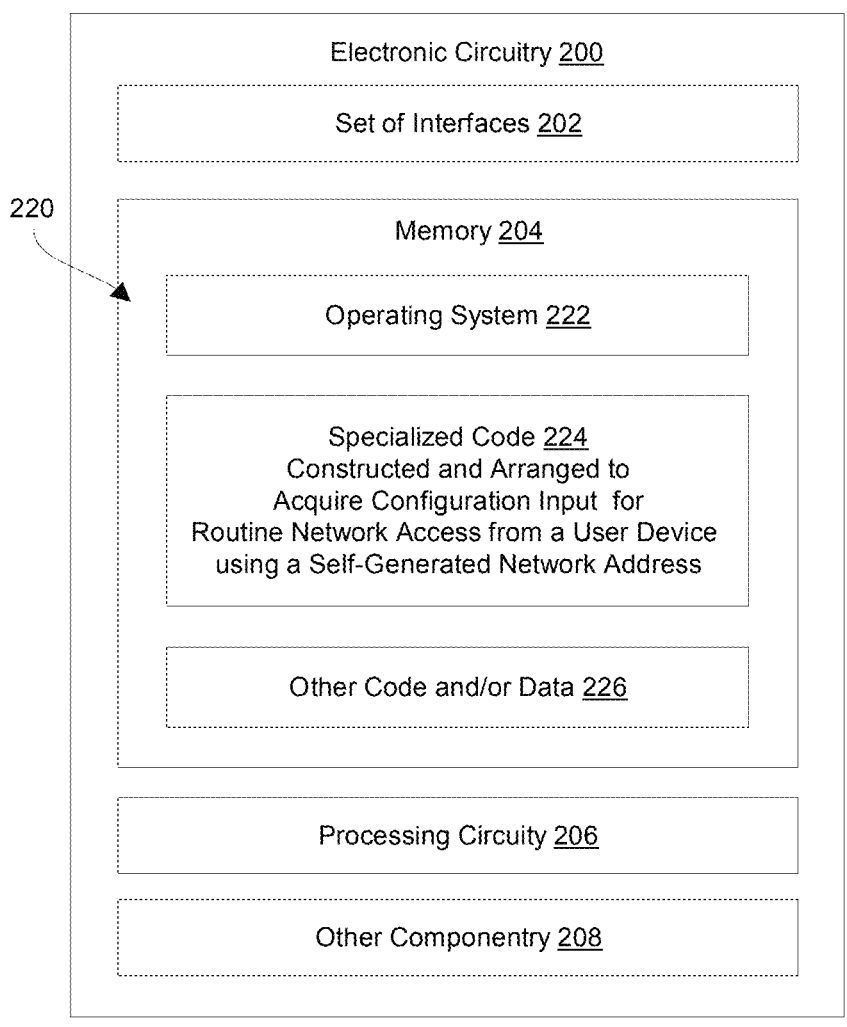

FIG. 2 shows electronic circuitry 200 which is suitable for use as at least a portion of the electronic equipment 104 in accordance with certain embodiments. The electronic circuitry 200 includes a set of interfaces 202, memory 204, processing circuitry 206, and other componentry (or circuitry) 208.

The set of interfaces 202 is constructed and arranged to connect the electronic circuitry 200 to the communications medium 108 (FIG. 1) to enable communications with other devices of the environment 100. Such communications may be IP-based, SAN-based, cellular-based, cable-based, fiber-optic based, wireless, cloud-based, combinations thereof, and so on. Accordingly, the set of interfaces 202 may include one or more host interfaces (e.g., a computer network interface, a fibre-channel interface, etc.), one or more storage device interfaces (e.g., a host adapter or HBA, etc.), and other interfaces. As a result, the set of interfaces 202 enables the electronic circuitry 200 to robustly and reliably communicate with various apparatus.

The memory 204 is intended to represent both volatile storage (e.g., DRAM, SRAM, etc.) and non-volatile storage (e.g., solid state memory, magnetic memory, etc.). The memory 204 stores a variety of software constructs 220 including an operating system 222, specialized code 224, and other code and data 226. The operating system 222 refers to particular control code such as a kernel to manage computerized resources (e.g., processor cycles, memory space, etc.), the I/O stack (e.g., drivers), and so on. The specialized code 224 refers to particular instructions and/or other software constructs for, among other things, acquiring configuration input for routine network access from a user device using a self-generated network address. The other code and/or data 226 refers to other constructs for various applications and tools, databases, settings, thresholds, combinations thereof, and so on.

The processing circuitry 206 is constructed and arranged to operate in accordance with the various software constructs 220 stored in the memory 204. Along these lines, the processing circuitry 206 may execute the specialized code 224 to form specialized circuitry that robustly and reliably acquires configuration input for routine network access via a set of new network addresses. Such processing circuitry 206 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 240 is capable of delivering all or portions of the software constructs 220 to the electronic circuitry 200. In particular, the computer program product 240 has a non-transitory (or non-volatile) computer readable medium which stores a set of instructions that controls one or more operations of the electronic circuitry 200. Examples of suitable computer readable storage media include tangible articles of manufacture and apparatus which store instructions in a non-volatile manner such as DVD, CD-ROM, flash memory, disk memory, tape memory, and the like.

The other componentry 208 refers to other hardware of the electronic circuitry 200. Along these lines, the electronic circuitry 200 may further include specialized equipment such as a power supplies, fans, specialized equipment, etc. Further details will now be provided with reference to FIG. 3.

Figure 3:
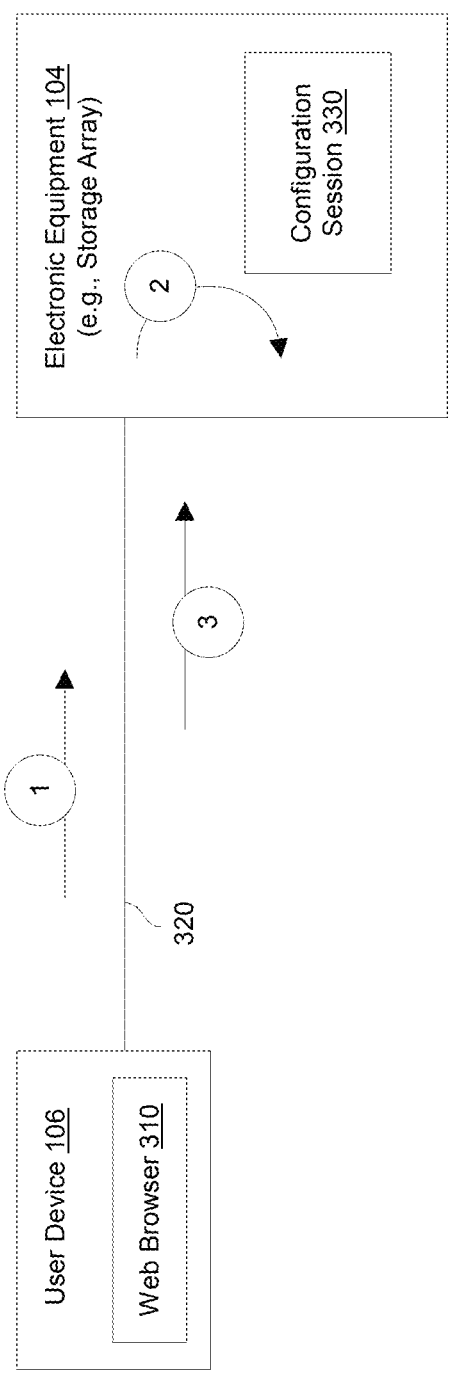
FIG. 3 is a block diagram illustrating particular configuring details in accordance with certain embodiments.

FIG. 3 illustrates particular configuring details in accordance with certain embodiments. In particular, the electronic equipment 104 performs various configuration operations that enable the electronic equipment 104 to then support routine network access (also see FIG. 1).

Initially, the electronic equipment 104 and the user device 106 are connected to the communications medium 108 (FIG. 1). In some arrangements, the electronic equipment 104 and the user device 106 are hardwire connected to a computerized network (e.g., routers, switches, other data communications devices, combinations thereof, etc.).

If the user device 106 had already been connected to a network and had been running for some time, the user device 106 already may have been provisioned with certain address information. Along these lines, the user device 106 already may have been assigned an IPv4 network address (e.g., a dynamic IPv4 network addressed assigned by a DHCP server, a static IPv4 network address programmed by the user, etc.). Additionally, the user device 106 may already have auto-generated an IPv6 network address (e.g., derived from the user device's MAC address).

If the user device 106 does not already have an IPv6 network address, the user simply changes a setting of the user device 106 to enable IPv6 (e.g., modifies a parameter for IPv6 from "not enabled" to "enabled"). In response, the user device 106 automatically generates (or derives) a local IPv6 network address (e.g., a network address in IPv6 format that begins with "FE80").

Next, the user initiates an exchange between the user device 106 and the electronic equipment 104. Along these lines, the user may launch a web browser 310 on the user device 106 and navigate the web browser 310 to a predefined network address on the electronic equipment 104. That is, the electronic equipment 104 has already been preconfigured with a local IPv6 network address (e.g., established during a testing and/or configuration process at the factory). Accordingly, the web browser 310 then sends a communication (e.g., a webpage request) to the local IPv6 network address of the electronic equipment 104 (arrow 1, in FIG. 3). As a result, the electronic equipment 104 establishes an IPv6-based network connection 320 with the user device 106 through the computer network in which the network connection 320 uses the predefined network address for the electronic equipment 104 and the self-generated network address for the user device 106.

In addition to establishing the network connection 320 with the user device 106, the electronic equipment 104 creates a configuration session 330 (arrow 2). Along these lines, the electronic equipment 104 returns a webpage (or a series of webpages) to the user device 106 through the network connection 320 prompting the user for configuration input.

As the user then provides the configuration input during the configuration session 330 such as a set of configuration commands (arrow 3), the electronic equipment 104 configures itself for routine operation based on the configuration input. Along these lines, the electronic equipment 104 becomes ready for routine network access via a set of new network addresses. Such addresses may include one or more IPv4 addresses (e.g., based on further communications with a local router), and/or one or more IPv6 addresses (e.g., global IPv6 addresses, etc.), combinations thereof, and so on.

Following such configuration, the electronic equipment 104 is available for routine network access. Along these lines, in the context of a storage array, the electronic equipment 104 may now be able to perform I/O operations in response to I/O requests (e.g., iSCSI commands) from a set of host computers (also see FIG. 1).

It should be understood that once the electronic equipment 104 is configured for routine network access, the user device 106 does not need to be reconfigured or reset back to using an original IPv4 address. Rather, any original IPv4 address of the user device 106 was left alone. Accordingly, there is no risk of applications and/or services failing (or breaking) due to IPv4 address modification, etc. Further details will now be provided with reference to FIG. 4.

FIG. 4 is a flowchart of a procedure 400 to configure electronic equipment for routine network access in accordance with certain embodiments. The procedure 400 may be performed by specialized circuitry (e.g., see the electronic circuitry 200 in FIG. 2).

At 402, the specialized circuitry establishes a network connection between the electronic equipment and a user device using a predefined network address for the electronic equipment and a self-generated network address for the user device. Along these lines, the network connection may be IPv6-based using local addresses (e.g., starting with "FE80"). In some arrangements, the user device is directed to derive a local-link IPv6 address by simply enabling IPv6 on the user device.

At 404, the specialized circuitry creates a configuration session on the electronic equipment, the configuration session being constructed and arranged to receive configuration input from the user device through the network connection established between the electronic equipment and the user device. Along these lines, the specialized circuitry may create a web-based session which queries a user of the user device for configuration input.

At 406, in response to a set of configuration commands from the user device received as configuration input by the configuration session, the specialized circuitry configures the electronic equipment for routine network access via a set of new network addresses. Upon such configuration, network devices are then able to communicate with the electronic equipment via the set of new network addresses.

It should be appreciated that, using the procedure 400, there is no need to change the current IPv4 network address of the user device and no need to deal with any aftermath of otherwise making such a change. Additionally, there is also no need to restore the current IPv4 network address of the user device and/or restart applications or network connections.

As described above, improved techniques are directed to configuring electronic equipment 104 from a user device 106 using a self-generated network address. Along these lines, a user may program network addresses into the electronic equipment 104 without changing an original IPv4 address of the user device 106 (e.g., a laptop, a desktop computer, or other smart device). Instead, the user is able to simply establish a network connection between the electronic equipment 104 and the user device 106 using a network address that is self-generated (or internally created) by the user device 106. Such a self-generated network address may be an Internet Protocol version 6 (IPv6) address that the user device automatically (or dynamically) creates when the user enables IPv6 or enters an auto link-local command on the user device 106. In such a situation, both the electronic equipment 104 and the user device 106 may then easily establish a rich and reliable network connection using local IPv6 addresses (e.g., establish a web session which enables the user to configure the electronic equipment).

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic setting 100 such as the host computers 102 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

It should be appreciated that a conventional device discovery process may require a human operator to perform several steps as well as possess knowledge as to how to reconfigure workstation network settings/configuration. Such complexity may impose delays in configuring a device such as a data storage assembly. Additionally, such complexity may result in the human operator improperly changing settings on the workstation thus disabling further use of the workstation.

However, with the improved techniques disclosed herein, electronic equipment may be deployed using its native protocol, e.g., IPv6. Moreover, such improved techniques may simplify how electronic equipment is deployed using IPv4, eliminating the need to reconfigure a workstation IPv4 address to a temporary network address and back again. The improved techniques not only eliminate the need to possess networking knowledge, the improved techniques improve the end user experience by reducing the number of steps and/or eliminating certain steps.

In accordance with certain embodiments, the user connects a user device to electronic equipment. On the user device, the user then directs a browser to a predefined network address (e.g., FE80::XXXX:XXXX:XXXX: XXXX) and, from there, configures the electronic equipment with one or more new network addresses (e.g., a set of IPv4 network addresses and/or a set of IPv6 network addresses).

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the electronic equipment was described above as being a storage array by way of example only. Other types of electronic equipment are suitable for use such as general purpose computing equipment, database equipment, computational equipment, network equipment, specialize equipment, combinations thereof, and so on. Such modifications and enhancements are intended to belong to various embodiments of the disclosure.

What is claimed is:

1. A method of configuring electronic equipment for routine network access, the method comprising:

establishing a network connection between the electronic equipment and a user device using a predefined network address for the electronic equipment and a self-generated network address for the user device;

creating a configuration session on the electronic equipment, the configuration session being constructed and arranged to receive configuration input from the user device through the network connection established between the electronic equipment and the user device; and in response to a set of configuration commands from the user device received as configuration input by the configuration session, configuring the electronic equipment for routine network access via a set of new network addresses;

wherein creating the configuration session includes:

receiving a page request from a browser running on the user device through the IPv6-based connection, and providing a webpage to the browser running on the user device through the IPv6-based connection to commence a web session as the configuration session.

2. The method of claim 1 wherein the electronic equipment is a storage array constructed and arranged to manage host data on behalf of a set of host computers; and wherein the method further comprises:

performing data storage operations in response to input/output (I/O) requests sent to the storage array from the set of host computers using the set of new network addresses.

3. The method of claim 2 wherein establishing the network connection between the storage array and the user device includes:

while the user device remains accessible to Internet Protocol version 4 (IPv4) communications via an IPv4 address, forming an Internet Protocol version 6 (IPv6)-based connection in which the predefined network address and the self-generated network address are IPv6 addresses.

4. The method of claim 3 wherein prior to establishing the network connection, the user device generates a unique local network address as the self-generated network address based on a media access control (MAC) address assigned to the user device; and wherein establishing the network connection between the storage array and the user device includes:

receiving a connection request from the user device, the connection request including the unique local network address as the self-generated network address for the user device, and in response to the connection request from the user device, exchanging messages between the storage array and the user device to form the IPv6-based connection.

5. The method of claim 2 wherein the set of configuration commands includes the set of new network addresses; and wherein configuring the electronic equipment for routine network access includes:

adding the set of new network addresses to the predefined network address to form a plurality of network addresses by which the storage array is accessible.

6. The method of claim 5 wherein the set of new network addresses includes an Internet Protocol version 4 (IPv4) address; and wherein adding the set of new network addresses includes:

configuring the storage array to receive and process I/O requests which use the IPv4 address as a destination address.

7. The method of claim 5 wherein the set of new network addresses includes an Internet Protocol version 6 (IPv6) address; and wherein adding the set of new network addresses includes:

configuring the storage array to receive and process I/O requests which use the IPv6 address as a destination address.

8. The method of claim 5 wherein the set of new network addresses includes an Internet Protocol version 4 (IPv4) address and an Internet Protocol version 6 (IPv6) address; and wherein adding the set of new network addresses includes:

configuring the storage array to receive and process I/O requests which use the IPv4 address and the IPv6 address as destination addresses.

9. The method of claim 6 wherein first I/O requests identify the storage array as a destination via an Internet Protocol version 4 (IPv4) address, and second I/O requests identify the storage array as a destination via an Internet Protocol version 6 (IPv6) address; and wherein performing the data storage operations includes:

writing data into a set of storage devices and reading data from the set of storage devices in response to the first I/O requests and the second I/O requests.

10. The method of claim 1 wherein the electronic equipment includes a storage array; and wherein the method further comprises:

processing Internet Small Computer Systems Interface (iSCSI) commands from a set of host computers to write host data into and read host data from the storage array.

11. Electronic equipment, comprising:

memory; and control circuitry coupled to the memory, the memory storing instructions which, when carried out by the control circuitry, cause the control circuitry to perform a method of:

establishing a network connection between the electronic equipment and a user device using a predefined network address for the electronic equipment and a self-generated network address for the user device;

creating a configuration session on the electronic equipment, the configuration session being constructed and arranged to receive configuration input from the user device through the network connection established between the electronic equipment and the user device; and in response to a set of configuration commands from the user device received as configuration input by the configuration session, configuring the electronic equipment for routine network access via a set of new network addresses;

wherein prior to establishing the network connection, the user device generates a unique local network address as the self-generated network address based on a media access control (MAC) address assigned to the user device; and wherein establishing the network connection between the electronic equipment and the user device includes:

receiving a connection request from the user device, the connection request including the unique local network address as the self-generated network address for the user device, and in response to the connection request from the user device, exchanging messages between the electronic equipment and the user device to form the network connection.

12. Electronic equipment as in claim 11 wherein the electronic equipment is a storage array constructed and arranged to manage host data on behalf of a set of host computers; and wherein the method further comprises:

performing data storage operations in response to input/output (I/O) requests sent to the storage array from the set of host computers using the set of new network addresses.

13. Electronic equipment as in claim 12 wherein establishing the network connection between the electronic equipment and the user device includes:

while the user device remains accessible to Internet Protocol version 4 (IPv4) communications via an IPv4 address, forming an Internet Protocol version 6 (IPv6)-based connection in which the predefined network address and the self-generated network address are IPv6 addresses.

13

14

14. Electronic equipment as in claim 13 wherein first I/O requests identify the storage array as a destination via the IPv4 address, and second I/O requests identify the storage array as a destination via the IPv6 address; and wherein performing the data storage operations includes:

writing data into a set of storage devices and reading data from the set of storage devices in response to the first I/O requests and the second I/O requests.

15. Electronic equipment as in claim 11 wherein creating the configuration session on the electronic equipment includes:

receiving a page request from a browser running on the user device through the network connection, and providing a webpage to the browser running on the user device through the network connection to commence a web session as the configuration session.

16. Electronic equipment as in claim 11 wherein the set of new network addresses includes an Internet Protocol version 4 (IPv4) address; and wherein configuring the electronic equipment for routine network access includes:

configuring the electronic equipment to receive and process network messages which use the IPv4 address as a destination address.

17. Electronic equipment as in claim 11 wherein the set of new network addresses includes an Internet Protocol version 6 (IPv6) address; and wherein configuring the electronic equipment for routine network access includes:

configuring the electronic equipment to receive and process network messages which use the IPv6 address as a destination address.

18. Electronic equipment as in claim 11 wherein the set of new network addresses includes an Internet Protocol version 4 (IPv4) address and an Internet Protocol version 6 (IPv6) address; and wherein configuring the electronic equipment for routine network access includes:

configuring the electronic equipment to receive and process network messages which use the IPv4 address and the IPv6 address as destination addresses.

19. A computer program product having a non-transitory computer readable medium which stores a set of instructions to configure computerized circuitry for routine network access, the set of instructions, when carried out by computerized circuitry, causing the computerized circuitry to perform a method of:

establishing a network connection between the computerized circuitry and a user device using a predefined network address for the computerized circuitry and a self-generated network address for the user device;

creating a configuration session on the computerized circuitry, the configuration session being constructed and arranged to receive configuration input from the user device through the network connection established between the computerized circuitry and the user device; and in response to a set of configuration commands from the user device received as configuration input by the configuration session, configuring the computerized circuitry for routine network access via a set of new network addresses;

wherein prior to establishing the network connection, the user device generates a unique local network address as the self-generated network address based on a media access control (MAC) address assigned to the user device; and wherein establishing the network connection includes:

receiving a connection request from the user device, the connection request including the unique local network address as the self-generated network address for the user device, and in response to the connection request from the user device, exchanging messages between the computerized circuitry and the user device to form the IPv6-based connection.

20. The computer program product of claim 19 wherein the computerized circuitry includes a storage array; and wherein the method further comprises:

processing Internet Small Computer Systems Interface (iSCSI) commands from a set of host computers to write host data into and read data from the storage array.

* * * * *